May 28, 1935.   W. H. SMITH   2,003,017
CONTROL APPARATUS FOR CAR CONNECTERS
Filed Nov. 29, 1929   10 Sheets-Sheet 1

WALTER H. SMITH   INVENTOR
BY
ATTORNEY

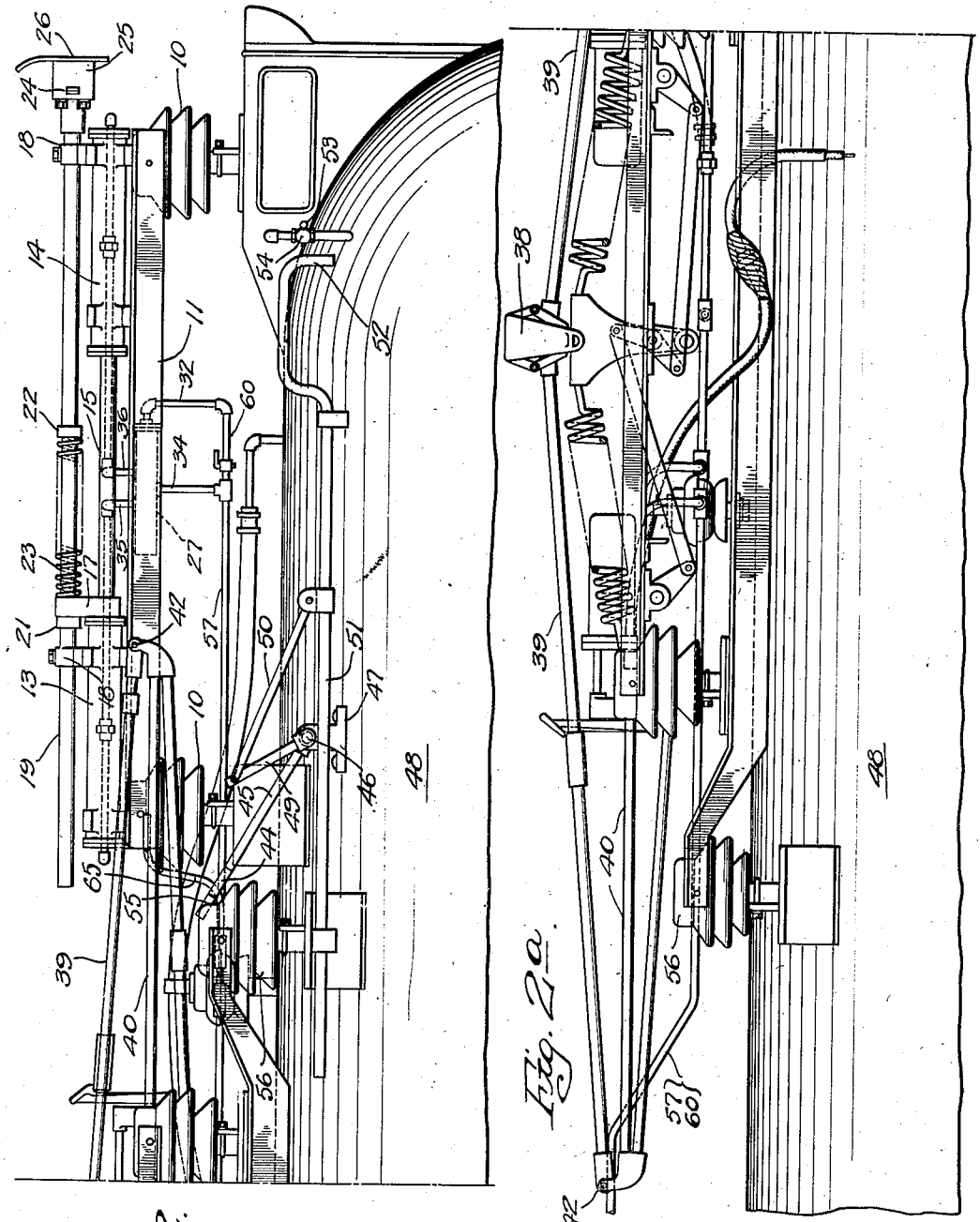

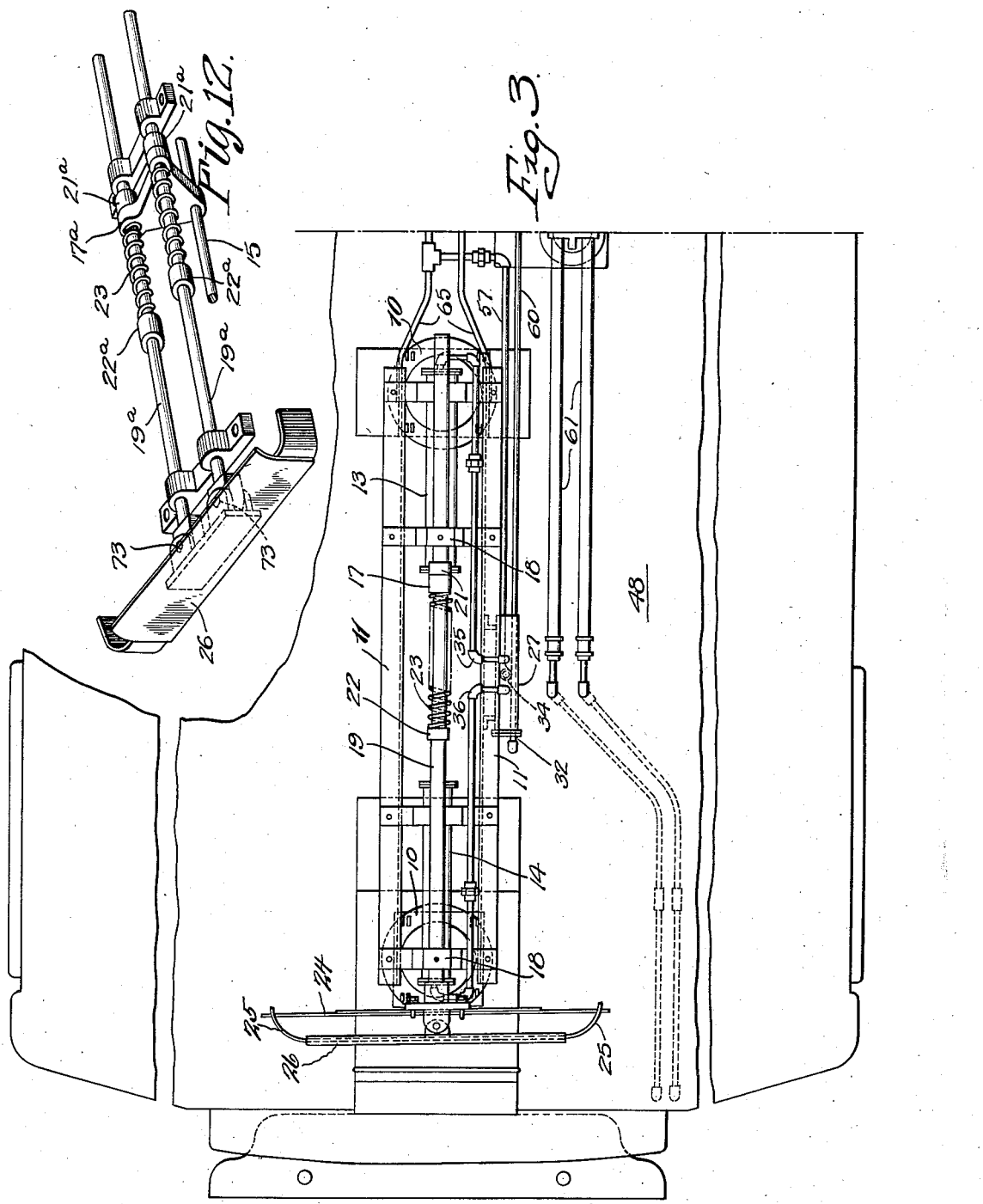

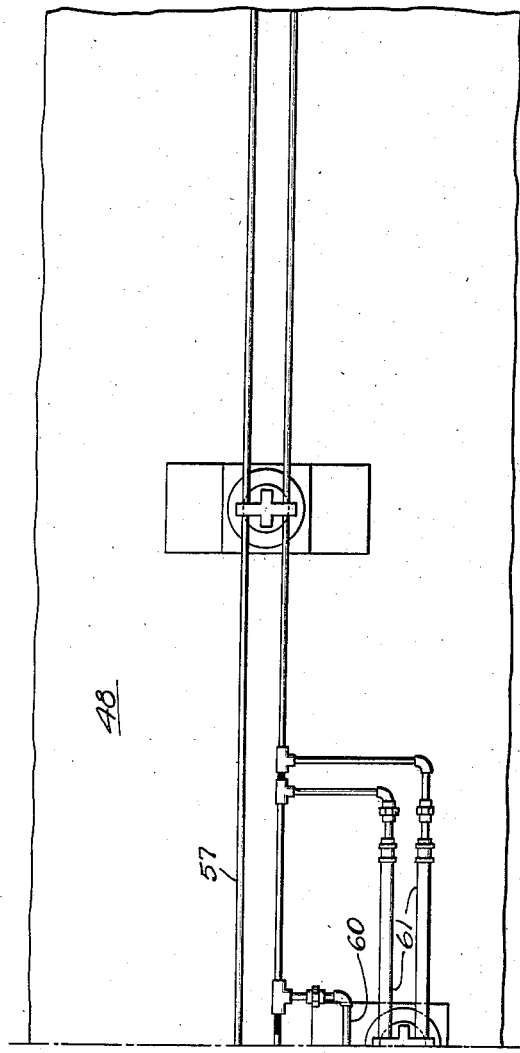
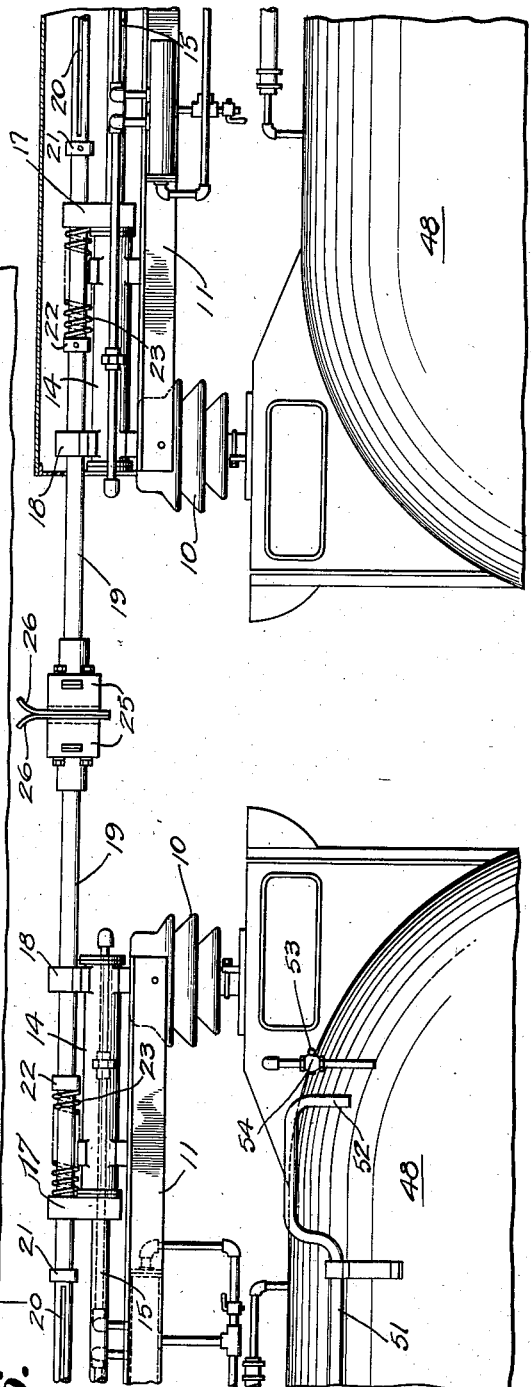

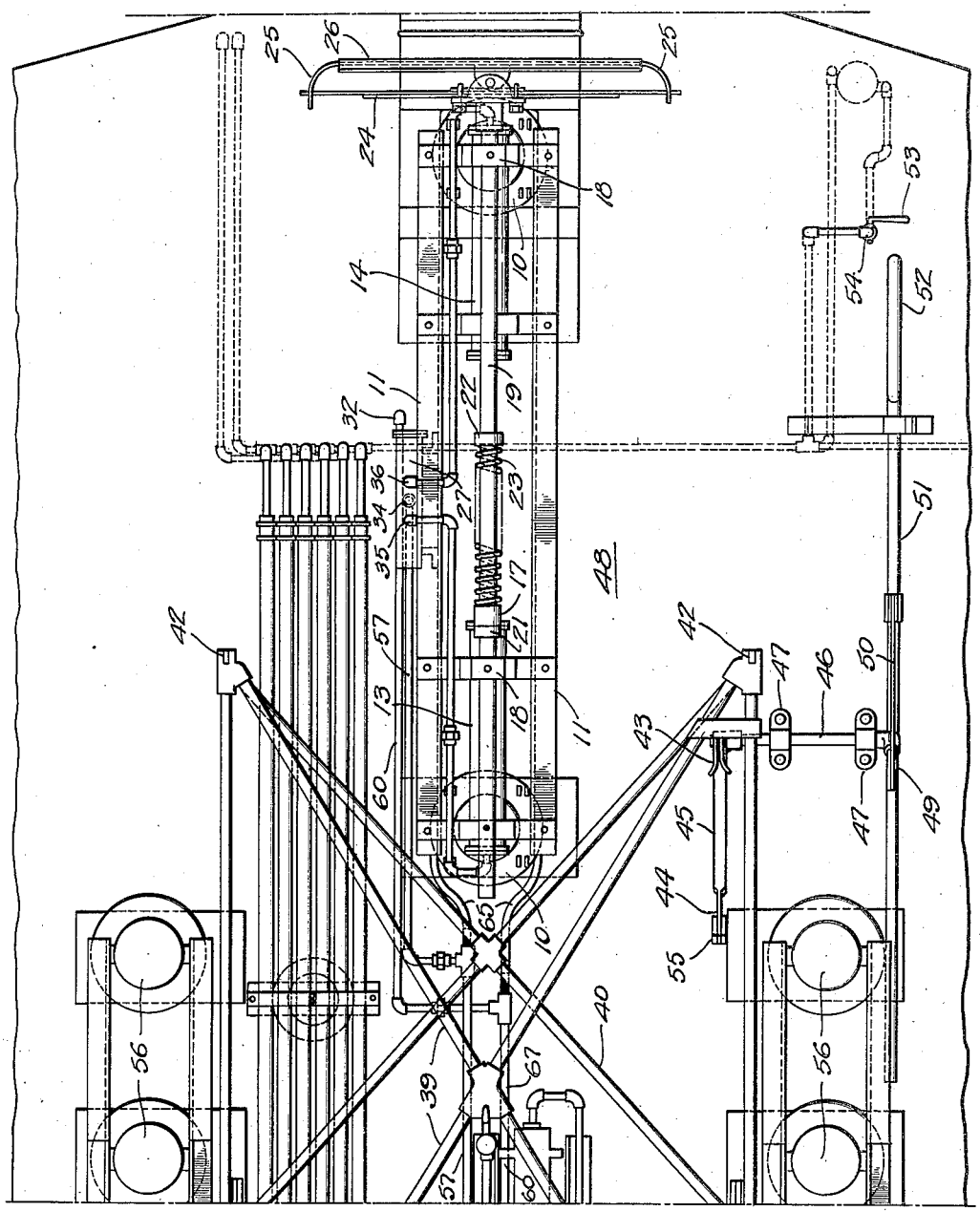

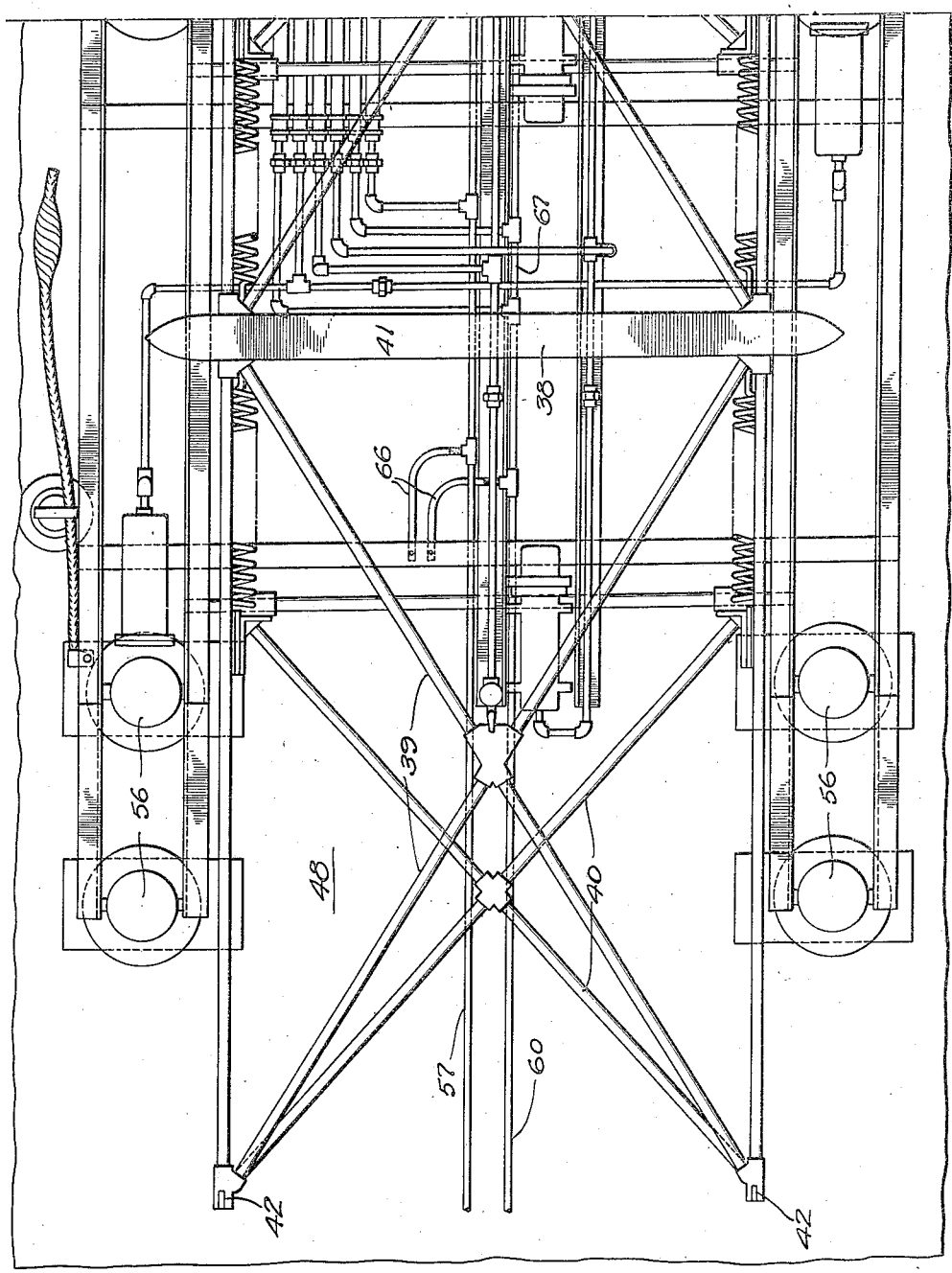

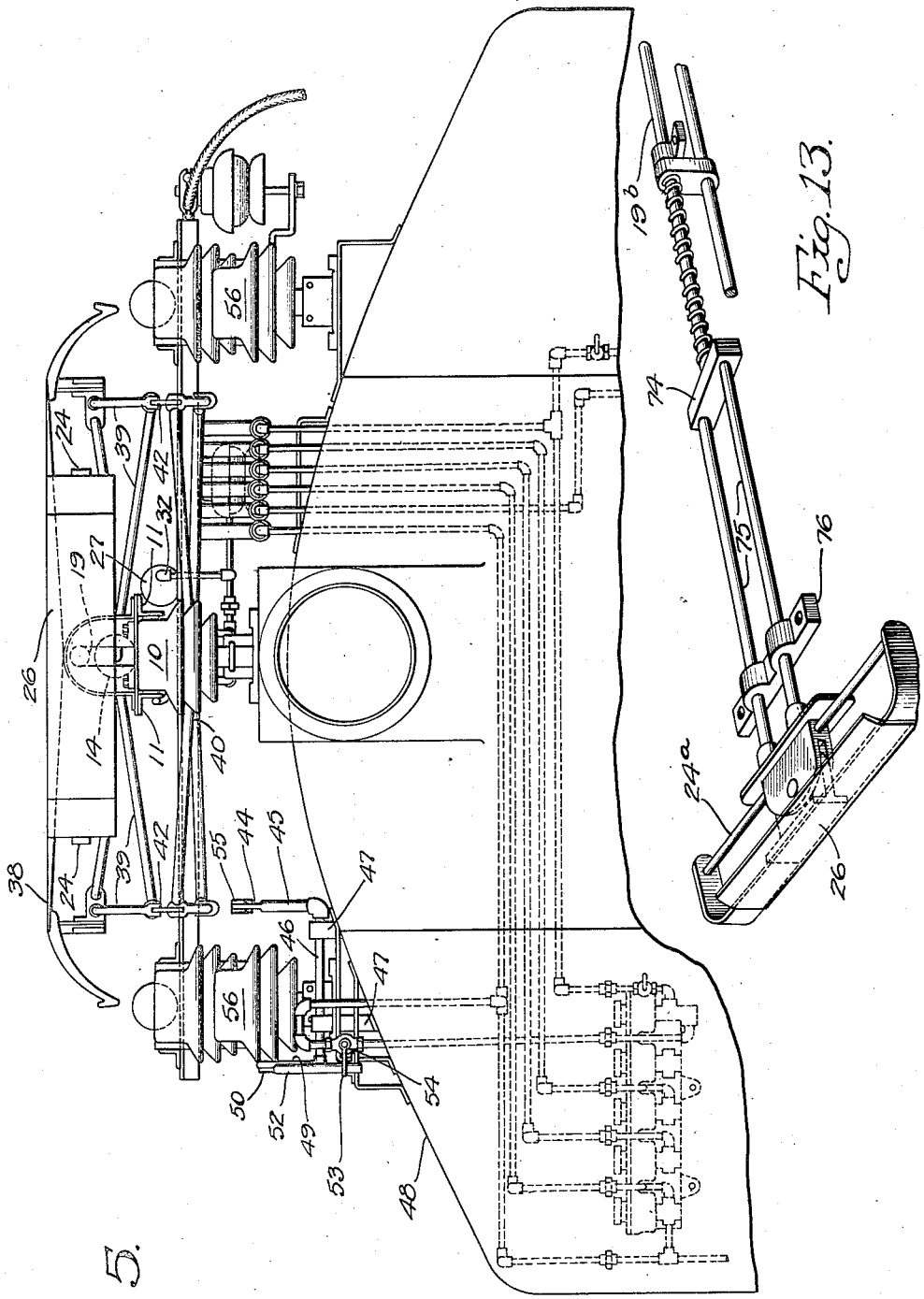

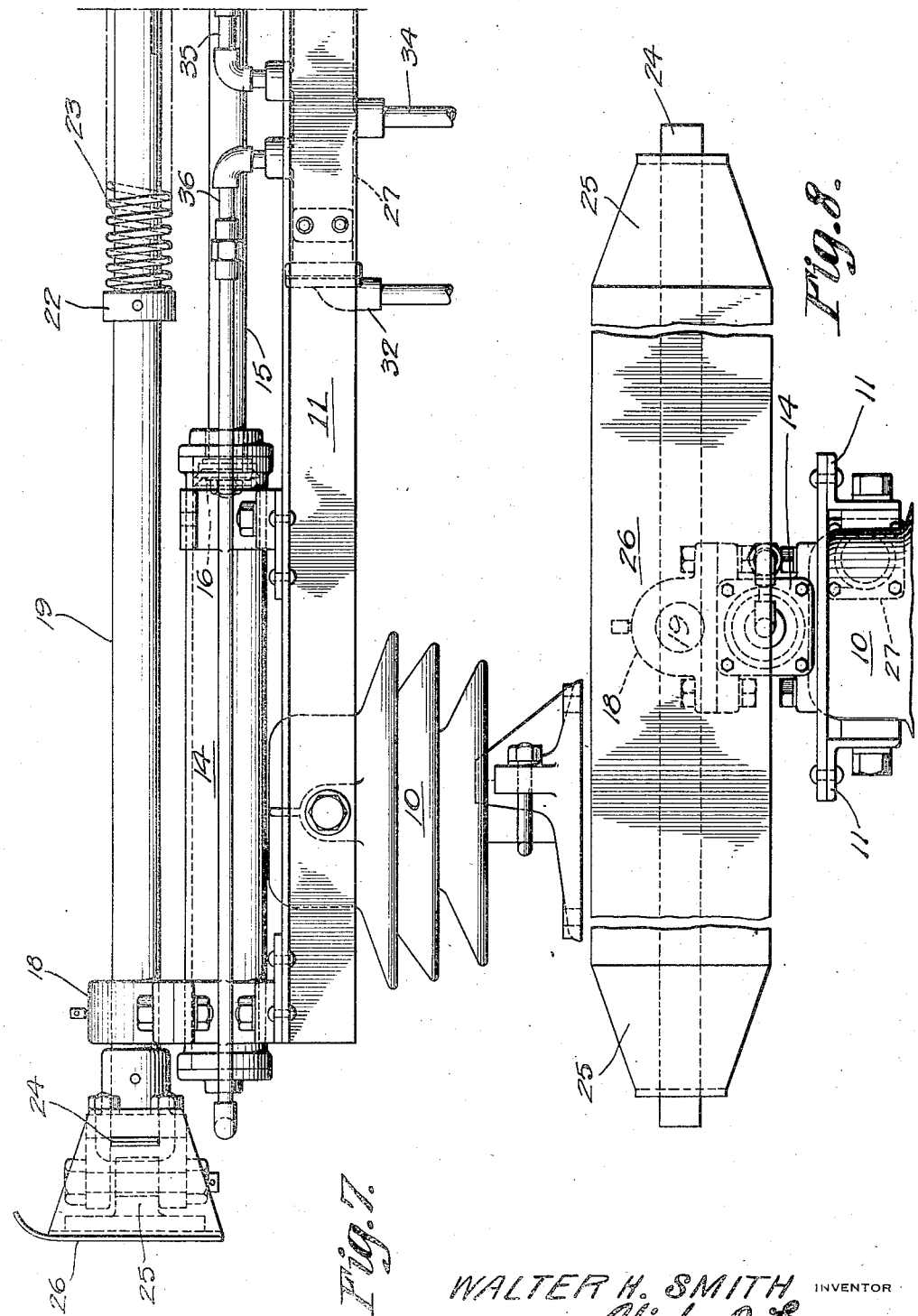

May 28, 1935.  W. H. SMITH  2,003,017
CONTROL APPARATUS FOR CAR CONNECTERS
Filed Nov. 29, 1929  10 Sheets-Sheet 9
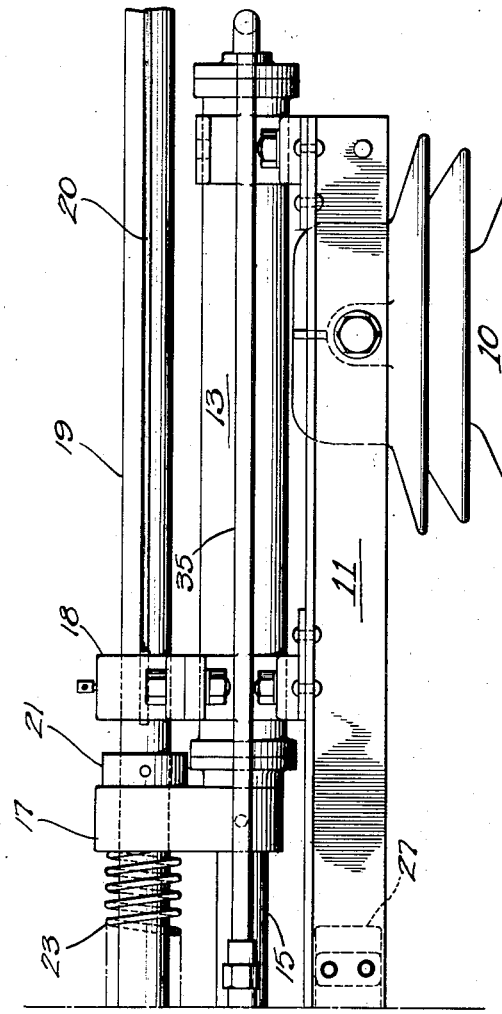
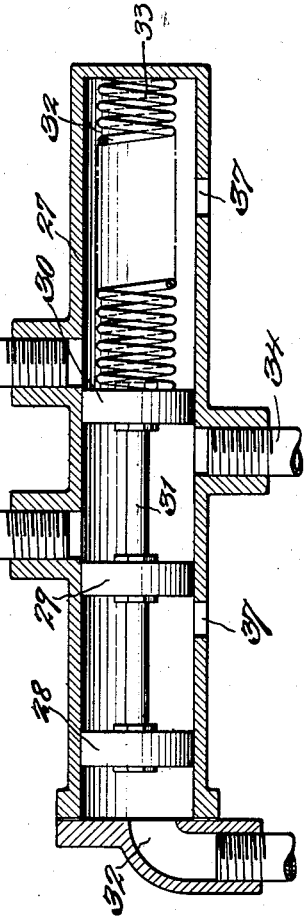
WALTER H. SMITH INVENTOR
BY Victor J. Evans
ATTORNEY May 28, 1935.  W. H. SMITH  2,003,017
CONTROL APPARATUS FOR CAR CONNECTERS
Filed Nov. 29, 1929   10 Sheets-Sheet 10
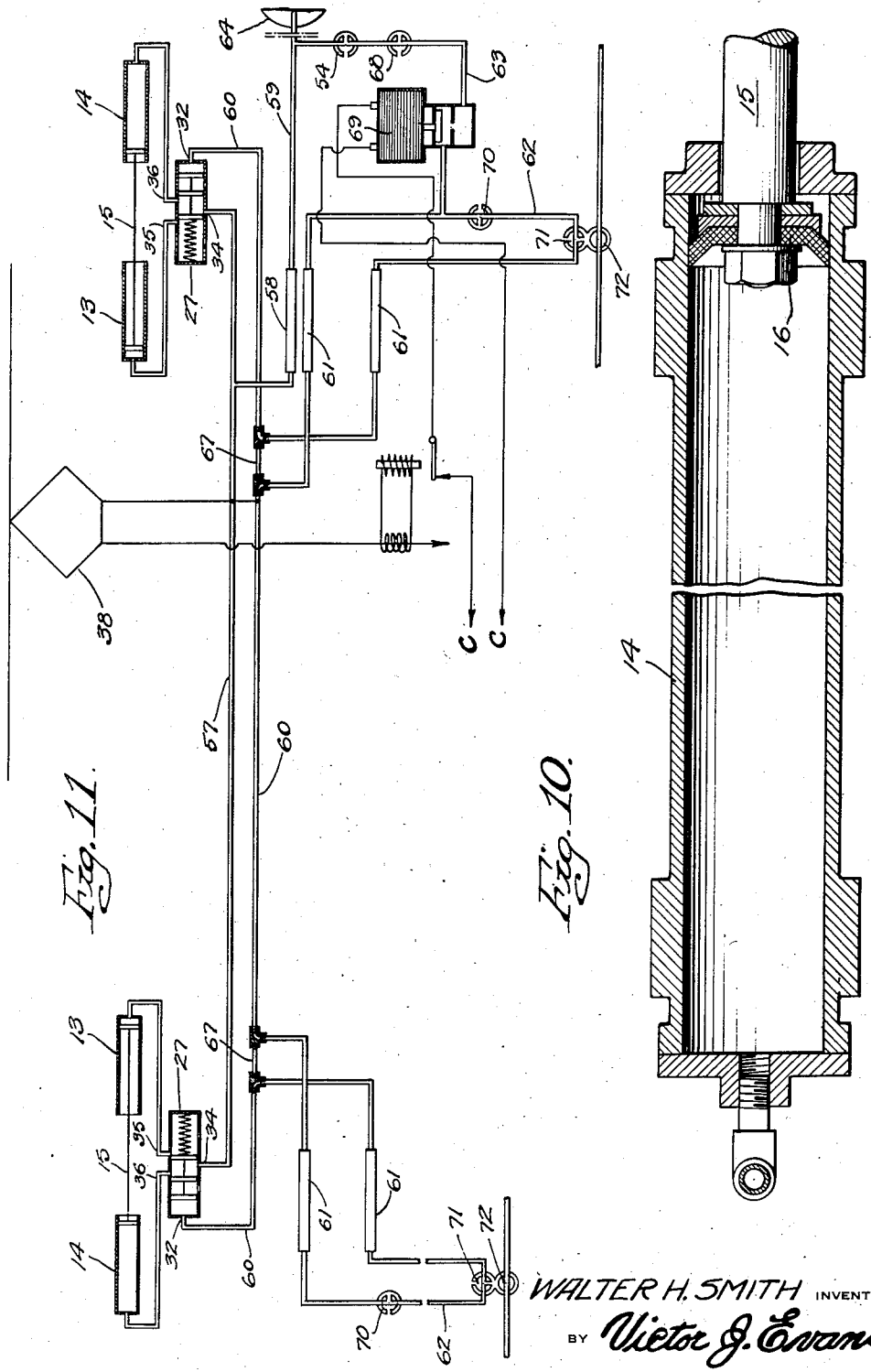

Patented May 28, 1935

2,003,017

UNITED STATES PATENT OFFICE 2,003,017

CONTROL APPARATUS FOR CAR CONNECTERS

Walter H. Smith, Philadelphia, Pa., assignor to Westinghouse Electric and Manufacturing Company, a corporation of Pennsylvania Application November 29, 1929, Serial No. 410,509

21 Claims. (Cl. 191—1)

This invention relates to control apparatus for car connecters, and more particularly, to a control apparatus for connecting means employed in electrically connecting adjacent cars of an electrical train.

An important object of the invention is the provision of a power bus-line connecter which may be remotely controlled and which, accordingly, may be located upon the roof of the car.

A further and more specific object of the invention is to provide fluid-pressure operating means for controlling the connection and disconnection of the bus lines of adjacent cars of such character that it may readily be so interlocked with the grounding apparatus that the pantograph or other trolley cannot be grounded until the connecting apparatus has been disconnected.

A still further object of the invention is the provision of a connecting apparatus of this character which will be automatically disconnected upon disconnection of the cars.

A still further object of the invention is the provision of connecting apparatus and operating mechanism therefor which may be readily and cheaply constructed, which is readily applied to the car and connected to the ordinary trolley system thereof, and which will be durable and efficient in service.

A still further object of the invention is the provision of a structure of this character such that under given electrical conditions, such as failure of insulation, from lightning, or the like, it will automatically electrically disconnect the affected car from adjacent cars of the train.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 2 is a similar view of the opposite end of the car, showing a portion of the pantograph and a grounding switch therefor.

Figure 2a is a view of the adjoining portions of the car, the pantograph being illustrated in lowered position.

Figure 3 is a plan view of one end of the car.

Figure 3a is a plan view of the intermediate portion of the car.

Figure 4 is a plan view of the opposite end of the car.

Figure 4a is a plan of the adjacent portion of the car roof.

Figure 5 is an end elevation of the car.

Figure 6 is a side elevation of the adjacent ends of the two cars with the bus connecter in operative relation.

Figure 7 is an enlarged side elevation of one end of the control and operating mechanism of the bus connecter.

Figure 7a is a similar view of the opposite end thereof.

Figure 8 is an enlarged end elevation of the bus connecter proper.

Figure 9 is a sectional view through the control valve.

Figure 10 is a sectional view through the control cylinder.

Figure 11 is a diagrammatic view illustrating the electrical and pneumatic connections of the control.

Figures 12 and 13 are perspective views illustrating optional forms of mountings for the bus connecter.

Figure 1:
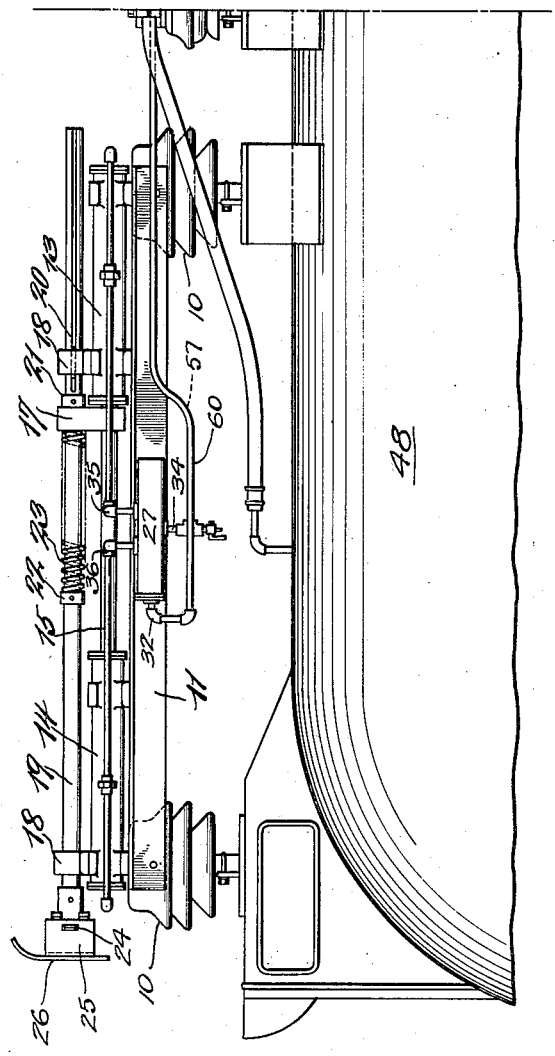
Figure 1 is a side elevation of the roof portion of one end of the car having a mechanism constructed in accordance with the invention.
Figure 1A:
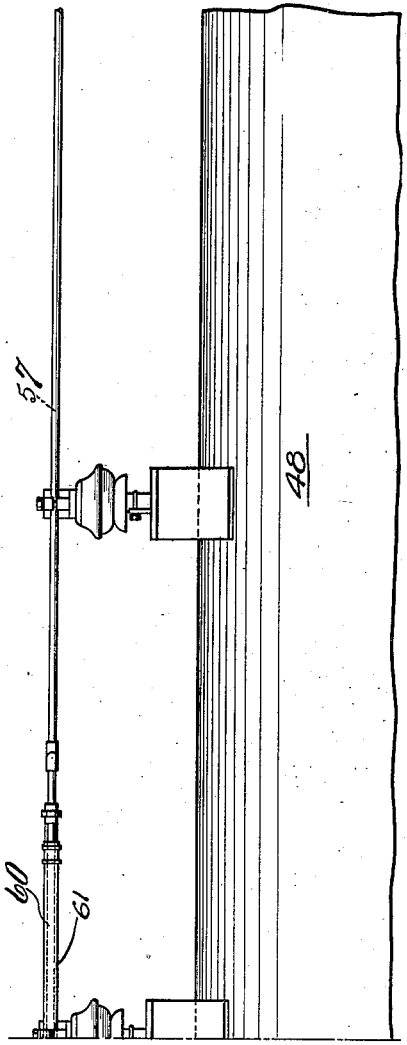
Figure 1a is a similar view of the intermediate portion of the car.

Referring now to the drawings and more particularly to Figures 1, 2, 3 and 4, 10 identifies insulators carried by the car roof and from which are supported longitudinally-extending supports or rails 11. Mounted upon the rails 11 at each end of the car are a pair of spaced cylinders 13 and 14, said cylinders having a common rod 15 equipped with a piston 16 for each cylinder (see Fig. 10). Adjacent ends of cylinders 13 and 14 are spaced so that rod 15 is exposed therebetween and the rod, upon its exposed portion, is equipped with a projection or arm, as at 17.

Likewise supported from rails 11 and preferably secured directly to cylinders 13 and 14 are bearings 18 in which is slidably mounted a shaft 19 splined to one of said bearings to prevent rotation, as at 20. The shaft 19 is passed through the arm 17 of piston-rod 15 and, at the side of said arm remote from the adjacent car, has secured thereto a collar 21. In spaced relation to the arm 17 and between said arm and the adjacent car end, a second collar 22 is secured to shaft 19 and between this collar and the arm, a spring 23 surrounds the shaft.

It will be obvious that if air is admitted to the one end of cylinder 13, causing the piston rod 15 and its arm 17 to move to the left in Figure 1, this arm will, through spring 23, exert a yielding pressure, forcing shaft 19 toward the adjacent car and causing a projection thereof. The yieldability of the shaft under projection should be noted. The outer end of the shaft 19, or that end overlying the car end, is equipped with a transversely-extending spring 24, the ends of which project through the arcuated ends of the supporting strip 25 bearing a connecter plate 26. The upper edges of the connecter plates 26 are preferably inwardly flexed, as more clearly shown in Figure 12, to prevent arcing at the contacting face of these plates, when they are separating.

Associated with each pair of cylinders 13 and 14 is a control valve which is more particularly shown in Figure 9.

This valve comprises a cylinder 27, one end of which is closed and within which is arranged a control element comprising three spaced pistons 28, 29 and 30 connected by a common rod 31 and constantly urged toward the opposite or inlet end 32 of the cylinder by a spring 33. An inlet 34 is provided in one side of the cylinder and outlets 35 and 36 are provided in the opposite side thereof and are connected to the remote ends of cylinders 13 and 14.

In the normal position of the valve structure, represented by pistons 28, 29 and 30, spring 33 has urged the valve structure to the left in Figure 9 until piston 30 intervenes between inlet 34 and outlet 35 and the space between pistons 30 and 29 is in communication with the inlet 34 and outlet 36, so that fluid pressure is supplied to cylinder 14 and the piston-rod 15 and its arm 17 are urged to the right in Figure 1, withdrawing shaft 19 and the contact plate carried thereby so that they no longer project for engagement with the contact plate of an adjacent car. When, however, fluid pressure is admitted through inlet 32, the piston structure is urged to the right in Figure 9 against the action of spring 33, placing the inlet 34 in communication with the outlet 35. In each instance, when an outlet 35 or 36 is thrown out of communication with the inlet 34, it is placed in communication with the atmosphere through an associated vent 37 formed in the cylinder.

Referring now more particularly to Figures 2, 2a, 4 and 4a, the numeral 38 generally identifies a current collector, at present illustrated as a pantograph, which as well-known to those familiar with the art, is movable to raised and lowered positions to place the same in and out of operative engagement with a feeder. This structure includes upper and lower pivotally-connected frames 39 and 40. At each side of a longitudinal center represented by the contractor 41, frames 39 and 40 are pivoted to the contactor and deck at their inner ends respectively and at their outer ends are pivotally connected to one another as indicated at 42.

The upper frame at one end of the pantograph structure, that end most nearly adjacent the nearer car end, is provided with switch blades 43 adapted to receive therebetween a knife 44 formed upon the free end of an arm 45 secured to one end of a grounded transversely-extending shaft 46 mounted in bearings 47 carried by the car roof 48. The opposite end of the shaft 46 has a relatively short arm 49 which, through a link 50, is connected with a longitudinally-slidable rod 51 carried by the car roof and having adjacent the car end an operating handle 52. In the path of the handle 52 there is disposed the handle 53 of a vented control valve 54, so that the control valve 54 must be shifted to its cut-off and venting position before handle 52 can be engaged to shift rod 51 longitudinally and thus to throw knife 44 into engagement with blades 43 and ground the pantograph.

Knife 44, at its extremity, has outstanding lugs or shoulders 55 which, when the knife is engaged with blades 43, extend over these blades and thus prevent elevation of the pantograph. The pantograph 38 is supported from insulators 56 which normally prevent grounding thereof, but it is electrically connected with the bus connecter mechanism hereinbefore described, as will hereinafter become obvious.

As more clearly seen in the diagrammatic showing of Figure 11, the inlets 34 of the control-valve mechanism are connected by a conduit 57 and this conduit is connected through an insulating pipe section 58 with a conduit 59 leading to a control reservoir 64.

Leading to each inlet 32 of the control cylinders 27 are conduits 60 connected through insulating sections 61 with the ends of a loop branch 62 of a conduit 63 likewise leading to the control reservoir 64. Conduits 57 and 60 extend longitudinally of the car and are insulated therefrom, but are electrically connected both to the rails 11, as at 65 (Fig. 2), and to the pantograph, as at 66 (Fig. 4a). The two conduits 60 are electrically connected to one another by a solid conductor as indicated at 67.

In the pipe 63 are disposed the valves 54, hereinbefore mentioned, a valve 68 similar to the valve 54 but located in the pantograph end of the car, or that end from which repair men must mount to the top of the car, and an electromagnetic valve 69 which is likewise a combined cutoff and venting valve. This electromagnet valve is operated through control circuit C.C. in event of current overcharges; because of break-down of insulation, or similar emergencies to cut off communication with the control reservoir 64 and to open line 60 to the atmosphere. In the loop branch 62 are arranged a valve 70, similar to valves 54 and 68, and a valve 71 operated by the main line valve 72 of the car. Valves 70 are preferably arranged in the control cabs at opposite ends of the car and serve to provide an operator's control for the bus-connecter mechanism.

It will be understood that if any of the valves 54, 68, 69, 70 or 71 are positioned to cut off supply from reservoir 64, the springs 33 will act to position the control valves so that fluid pressure is supplied to the cylinders 14 and the movable elements of the bus connecters, represented by the shaft 19 and the parts supported thereby, will be moved to withdrawn position, cutting off the bus-line connection between the car, upon which the valve is operated, and an adjacent car or cars. If however, these valves are positioned to preserve the continuity of the fluid-transmission line to conduits 60, then the fluid pressure will act to shift the piston element of the control valve so that fluid pressure is admitted to the cylinder 13 and the shafts 19 and their associated parts are shifted outwardly to establish the bus-line connection.

Since, as hereinbefore noted, it is impossible to ground the collector 38, as represented by the pantograph, without first moving valve 54 to its closed and venting position, it is likewise impossible to ground the pantograph until the bus line connections between adjacent cars have been withdrawn. As the grounding switch likewise serves to lock pantograph 38 in its lowered position, it is impossible to raise the pantograph while valve 54 is in its open position; for, in this event, the hook end forming the handle 52 will come into engagement with handle 53 of valve 54, preventing disengagement of lugs or shoulders 55 until this valve is moved to its closed and venting position. Since control valve 71 is affected by the main line valve 72, it will always be in its closed and venting position when the car is disconnected and will not move into its open position until the main line valve has been actuated to provide connection between adjacent cars. Thus disconnection of a car or a break-down of insulation, or other form of overcharge will automatically cause a withdrawal of the bus connecter.

While the movable element of a bus connecter is described as consisting of a shaft 19 bearing the connecter plate, it will be obvious that such structure is capable of considerable modification. For example, in Figures 12 and 13, there are illustrated two possible modifications of this structure. In Figure 12 there is shown, instead of a single shaft, as described, a pair of shafts 19a in side by side relation and each passed through an aperture formed in an arm 17a carried by the piston-rod 15. Each of the shafts 19a is equipped with stop collars 21a, 22a corresponding in arrangement to the collars 21 and 22 hereinbefore described and between each collar 22a and the yoke 17a, a spring 23 surrounds the associated shaft. The outer ends of these shafts are pivotally connected directly to the connecter plate circuit, as indicated at 73. This structure has the advantage over the structure hereinbefore described that it necessitates no special spring mounting for the contact plate and eliminates the necessity for the provision of a spline to prevent rotation of the movable element. The rotation of the movable element can, however, be prevented by employing a structure, such as shown in Figure 13, wherein the shaft 19b is mounted similarly to shaft 19 hereinbefore described but has, at its outer end, a head 74 provided with parallel arms 75 directed through suitable bearings 76 and to which the spring 24a is secured.

The invention having been set forth, what is claimed is:

1. In combination, a car body, a current collector carried thereby, a conductor leading from the current collector, means at an end of the car for connecting the conductor to a similar conductor on a second car, means for grounding the current collector, and means preventing operation of the grounding means while the conductor is connected to the conductor on the second car.

2. In combination, a car body, a current collector carried thereby, a conductor leading from the current collector, means at an end of the car for connecting the conductor to a similar conductor on a second car, said current collector being movable from operative to inoperative position, means for locking the current collector in the inoperative position, and means for preventing operation of said locking means until said connecting means is disconnected.

3. In combination, an overhead current collector for electrically-operated cars movable to a raised and a lowered position, cooperative connecters between two cars, and means for grounding the current collector only operable subsequently to separating the connecters, said grounding means including a part for locking the current collector in the lowered position.

4. In combination, a car body, a current collector carried thereby, a conductor leading from the current collector, means at an end of the car for connecting the conductor to a similar conductor of a second car, means for grounding the current collector, and means preventing operation of the grounding means while the conductor is connected to the conductor of a second car, said current collector being movable from an operative to an inoperative position, said grounding means including a part for locking the current collector in the inoperative position.

5. In combination with an electrically-operated car having a current collector, a conductor electrically connected to the current collector and extending longitudinally of the car and having at opposite ends thereof sections longitudinally movable while maintaining electrical continuity, contact elements carried by the outer ends of said movable sections for engagement with similar contact elements carried by a second car or cars, means for moving said movable parts to cause projection of the contact elements, and means rendering said moving means inoperative under overload current conditions.

6. A fluid pressure operated bus connecter for electrically operated cars comprising a rod, fluid pressure means for operating said rod, a conductor adjacent the rod, an arm carried by the rod and yieldably connected with the conductor whereby the conductor moves with the rod and is yieldable in its several positions, and a contact plate carried by the conductor.

7. In combination a pair of special cylinders, pistons therein, a common rod for the pistons, an arm carried by the rod, a conductor mounted for longitudinal movements in direction parallel with the rod, an operable yieldable connecter between the rod and the conductor, and a contact plate carried by the conductor.

8. The combination with adjacent ends of vehicles, of a conductor carried by each vehicle, fluid-pressure operated means for actuating each conductor to bring the conductors into connecting relation and for withdrawing the conductors from the connecting position, and controlling means for the fluid-pressure operated means disposed to initiate a contacting operation thereof upon the introduction of pressure fluid to said controlling means and to initiate a withdrawing operation of the conductors by the fluid-pressure operated means upon the withdrawal of the pressure fluid from said controlling means.

9. The combination with adjacent ends of vehicles, of a conductor carried by each end thereof, fluid-pressure operated means associated with each conductor for actuating the conductor into contacting relation with the other conductor and for withdrawing the conductors from the contacting position, and controlling means for the fluid-pressure operating means automatically initiating a withdrawing operation of the conductors by the fluid-pressure actuating means upon a predetermined reduction of the fluid pressure in said controlling means.

10. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, the contact shoe on one car being connected to the pantograph and on the other car to the motor, means for actuating the contact shoe on one car into engagement with the contact shoe on another car to connect the motor on one car to the pantograph on another car to supply the motor with electric current, and a valve comprising a plurality of spaced pistons disposed in a cylinder for controlling the admission of a pressure fluid to the actuating means.

11. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, the contact shoe on one car being connected to the pantograph and on the other car to the motor, means for actuating the contact shoe on one car into engagement with the contact shoe on another car to connect the motor on one car to the pantograph on another car to supply the motor with electric current, and valve means comprising a plurality of spaced pistons disposed in a cylinder for controlling the admission of a pressure fluid to the actuating means, said actuating means being disposed to retract the contact shoes when the cars are separated.

12. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, the contact shoe on one car being connected to the pantograph and on the other car to the motor, means for actuating the contact shoe on one car into engagement with the contact shoe on another car to connect the motor on one car to the pantograph on another car to supply the motor with electric current, and means for controlling the actuating means, said actuating means being disposed to retract the contact shoes when the electric current exceeds a predetermined amount.

13. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, the contact shoe on one car being connected to the pantograph and on the other car to the motor, means for actuating the contact shoe on one car into engagement with the contact shoe on another car to connect the motor on one car to the pantograph on another car to supply the motor with electric current, and means for controlling the actuating means, said bus-line connecter being electrically insulated from the car body, and said actuating means being disposed to retract the contact shoes in case of a break-down of the electrical insulation.

14. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, the contact shoe on one car being connected to the pantograph and on the other car to the motor, pneumatic means for actuating the contact shoe on one car into engagement with the contact shoe on another car to connect the motor on one car to the pantograph on another car to supply the motor with electric current, and pneumatically-actuated means for controlling the pneumatic means for actuating the contact shoes.

15. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, the contact shoe on one car being connected to the pantograph and on the other car to the motor, pneumatic means for actuating the contact shoe on one car into engagement with the contact shoe on another car to connect the motor on one car to the pantograph on another car to supply the motor with electric current and means for controlling the pneumatic-actuating means, said pneumatic-actuating means being disposed to retract the contact shoes when the cars are separated.

16. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, the contact shoe on one car being connected to the pantograph and on the other car to the motor, pneumatic means for actuating the contact shoe on one car into engagement with the contact shoe on another car to connect the motor on one car to the pantograph on another car to supply the motor with electric current, means for controlling the pneumatic-actuating means, and electro-pneumatic means disposed to retract the contact shoes when the electric current exceeds a predetermined amount.

17. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, the contact shoe on one car being connected to the pantograph and on the other car to the motor, pneumatic means for actuating the contact shoe on one car into engagement with the contact shoe on another car to connect the motor on one car to the pantograph on another car to supply the motor with electric current, means for controlling the pneumatic-actuating means, said bus-line connecter being electrically insulated from the car body and electro-pneumatic means disposed to retract the contact shoes in case of a break-down of the electrical insulation.

18. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, means for actuating the contact shoe on one car into engagement with the contact shoe on another car to connect the motor on one car to the pantograph on another car to supply the motor with electric current, means for grounding the pantograph, and means for preventing operation of the grounding means while the contact shoe on one car engages the contact shoe on another car.

19. In a bus-line connecter for a train of cars having propelling motors on more than one car for connecting a pantograph to the motors on more than one car, in combination, contact shoes carried by the cars, the contact shoe carried by one car being disposed to aline with the contact shoe of the next adjacent car when the cars are brought together, means for actuating the contact shoe on one car into engagement with the contact shoe on another car to connect the motor on one car to the pantograph on another car to supply the motor with electric current, means for grounding the pantograph, and means for preventing operation of the contact-shoe-actuating means while the pantograph is grounded.

20. The combination with electric cars in a train, of a current collector for each car, a bus line extending along each car, a bus line connecter at each end of each car for engaging the bus line connecter on the adjacent end of a coupled car, and means responsive to an overload flow of current in any car for disconnecting the bus line on that car from the bus lines on adjacent cars.

21. The combination with electric cars in a train, of a current collector for each car, a bus line extending along each car and electrically connected to the current collector on that car, a bus line connecter at each end of each car for engaging the bus line connecter on the adjacent end of a coupled car, and means on each car responsive to an overcurrent condition in that car for disconnecting the bus line on that car from the bus lines on adjacent cars.

WALTER H. SMITH.